3,780,163
PROCESS FOR REMOVING IRON CARBONYL WITH OZONE
Robert H. Callighan and John O. Hawthorne, Penn Hills Township, Allegheny County, Pa., assignors to United States Steel Corporation
No Drawing. Filed June 5, 1972, Ser. No. 259,983
Int. Cl. B01d 53/34
U.S. Cl. 423—210                 11 Claims

ABSTRACT OF THE DISCLOSURE

Liquids and gases containing iron carbonyl contaminants may have these carbonyls reduced by reaction with up to stoichiometric amounts of ozone to convert the carbonyls into ferrous carbonate.

BACKGROUND OF THE INVENTION

Iron carbonyl is a contaminant in the products for many important liquid and gaseous reactions. For example, it is a contaminant present in the industrial production of methanol and in coke oven gas. In coke oven gas, it is among many chemical species which will react with ozone. The selective removal of iron carbonyl from such streams has been a difficult problem, C. F. Auselgeschrift 1,152,392; Chemical Engineering Progress, Symposium Service, volume 66, No. 98, pages 24–27, 1970, U.S. Pat. 3,466,340.

OBJECTS OF THE INVENTION

This invention includes among its objects providing a method for at least reducing the concentration of iron carbonyls from liquid or gaseous streams containing these carbonyls by a simple selective method for conversion of the carbonyls into ferrous carbonate.

Another object of this invention is to reduce or eliminate the catalyst poisoning tendencies of a stream containing iron carbonyl by converting the carbonyl into ferrous carbonate.

It is a further object of this invention to provide for the subsequent removal of the ferrous carbonate from liquid streams which had been contaminated with iron carbonyl.

DESCRIPTION OF THE INVENTION

By the practice of this invention, gas or liquid streams are reacted with up to stoichiometric amounts of ozone to convert iron carbonyls into ferrous carbonate. Iron carbonyl includes those members having the formula, $Fe_x(CO)_n$; these compounds are considered to be combinations of iron and the carbon monoxide radical. The compounds are generally tetracarbonyl, pentacarbonyl and nonacarbonyl, having values for $n$ of 4, 5 and 9, respectively. Although the exact reaction that occurs is not known, the reaction of these iron carbonyls with ozone is shown schematically as:

$x$=1 or 2
$y$=4, 5 or 9
$X$=1 or 2
$Y$=0, 1 or 4
$Z$=1 or 2

For iron pentacarbonyl, about three moles of ozone per mole of iron pentacarbonyl are stoichiometric reaction ratios. The reaction product is ferrous carbonate. At high temperatures, the ferrous carbonate is decomposed into iron oxide. While iron carbonyl is highly reactive and known as a catalyst poison, ferrous carbonate is relatively inert. The conversion of carbonyl to ferrous carbonate is itself sufficient to make a carbonyl containing stream suitable for catalytic conversions.

The ozone used for this invention may be pure ozone or it may be ozone in combination with nitrogen and oxygen. Ozone is often commercially available from the electrostatic discharge processing of oxygen or air mixtures to yield a stream containing about 2% ozone. Commercially available ozone generators may be used in the practice of the invention, if the liquid or gas stream being treated can tolerate oxygen.

The liquid or gas streams containing iron carbonyl as a contaminant are those generally in which carbon monoxide has been exposed to iron under pressure. This iron may be part of a catalyst or a part of a vessel. These include such gases as result from the destructive distillation of coal, coke oven gas and liquids in which iron catalysts are used for chemical reactions, e.g. the synthesis of methanol or oxo-alcohols. The iron carbonyl is generally present in minor amounts; amounts of less than about 1% by weight of iron carbonyl down to about a .0001 mole percent of iron carbonyl. Particularly, the gas streams may contain other ozone reactive chemical species such as olefins, aromatic hydrocarbons, ammonia, hydrogen sulfide, nitrogen oxide, amines and organic sulfide. These other chemically reactive species may be present at concentrations of 100 or 1000 times that of the iron carbonyl. The liquid stream will generally have hydrocarbon, methanol, higher alcohols, ketones or aldehydes. Typically, these streams are the result of processes such as the Fischer-Tropsch Synthesis or the Oxo Process in which carbon monoxide is under pressure in the presence of iron and which forms the iron carbonyl. The iron carbonyl concentration of such liquids will generally be about .01–10 p.p.m. by weight of the liquid stream. In the case of gases, conventional cleaning processes usually remove the ferrous carbonate formed from the iron carbonyl or the concentration of ferrous carbonate is so small that it has no deleterious effect in the process to which the gases are subjected. In the cases of the liquid streams, the ferrous carbonate is likewise present in very small concentration and the stream itself will generally be suitable for use even if the ferrous carbonate is present. However, the ferrous carbonate may tend to cloud such liquid streams and removal of the ferrous carbonate from this stream is desirable to prevent such cloudiness from occurring.

The extent to which iron carbonyls are removed from the streams containing the carbonyl depends upon the amount of ozone added to the stream. When a stoichiometric amount of ozone is added to the stream, substantially all of the iron carbonyl is converted into ferrous carbonate. In some cases, a minimum amount of carbonyl can be tolerated so it is only necessary to convert a portion of the carbonyl present. This may be done by using less than a stoichiometric amount of ozone for conversion of the carbonyl into the carbonate. By controlling the amount of ozone, the degree of reduction of iron carbonyl concentration in the stream is also controlled.

The reaction temperature may vary over a wide range. Temperatures as low as about −70° C. or as higher as 200° C. are particularly useful. At temperatures above about 250° C., the ferrous carbonate will decompose exothermically to produce iron oxide. Generally, the ozone is introduced into the gas or liquid stream at the amibent temperature of the stream.

The reaction may take place under pressures from about atmospheric up to 10 atmospheres or more. Pressures of one atmosphere are convenient because large numbers of industrial processes yielding gaseous or liquid streams having the iron carbonyl contaminants are performed at this pressure. The ozone should be thoroughly mixed with the gas or liquid stream into which it is introduced.

The ferrous carbonate which is the product of the reaction between ozone and the iron carbonyl is an amorphous solid that can be removed from the stream in which it is formed. In the case of liquid streams, filtration or centrifugation easily remove the ferrous carbonate from the liquid body. At temperatures above about 250° C., ferrous carbonate will decompose to produce iron oxide. The iron oxide may also be removed by filtration or centrifugation or other conventional methods such as electrostatic precipitation.

The practice of the invention is illustrated by the following examples.

EXAMPLE 1

Iron pentacarbonyl was dissolved in ethyl acetate to give a solution containing 1.08% by weight of iron pentacarbonyl or 0.485 mole percent of ethyl acetate. This solution was cooled to $-35°$ C. and then reacted with an ozone oxygen stream, this stream had about 5% ozone. The reaction was continued until an amount of ozone calculated to give a 3 to 1 mole ratio for iron carbonyl was introduced. A brown precipitate was filtered and dried from the solution: This precipitate was amorphous ferrous carbonate.

EXAMPLE 2

A gas mixture containing 30% methane, 6% carbon monoxide, 0.46% nitrogen and the remainder essentially hydrogen with three parts per million by volume of iron pentacarbonyl was reacted with an amount equivalent to 9 parts per million by volume of ozone. After mixing, no iron carbonyl could be detected in the exit gas and a brown deposit was removed by gravity separation from the gas, which deposit was identified as ferrous carbonate.

EXAMPLE 3

The procedure of Example 2 was repeated except that the gas contained 10 parts per million by volume of 1,3-butadiene. When using 9 parts per million by volume of ozone, the iron pentacarbonyl was still completely removed in the form of ferrous carbonate while the butadiene was unaffected.

EXAMPLE 4

The procedure of Example 2 was repeated except that the gas contained 40 parts per million by volume of dimethyl sulfide. Again, when using 9 parts per million by volume of ozone, the iron pentacarbonyl was still completely removed without affecting the dimethyl sulfide.

EXAMPLE 5

The procedure of Example 2 was repeated except that the gas also contained 3 parts per million by volume of nitric oxide. When this gas was treated with 9 parts per million by volume of ozone, the iron carbonyl was completely reacted, however, the nitric oxide remained untouched.

These gas mixtures represent the kinds of gases which are present in the processing of coke oven gas.

This invention therefore provides a method for the selective reduction of iron carbonyl from liquid or gas streams containing the same. This reduction results in the formation of ferrous carbonate which may then be removed from the stream. While this invention has been described by specific example and illustration, it is considered to include those variations in the process steps that would be deemed equivalents by one skilled in the art.

We claim:

1. A process for treating gaseous or liquid streams containing iron carbonyl comprising mixing with said stream up to a stoichiometric amount of ozone for reaction with said carbonyl to yield ferrous carbonate.

2. The process of claim 1 wherein the iron carbonyl is present at a concentration of less than about one mole percent.

3. The process of claim 1 wherein the stream contains ozone reactive chemical species in addition to the iron carbonyl, said species having concentrations that are greater than that of the iron carbonyl.

4. The process of claim 1 wherein the stream is a gas stream obtained from the destructive distillation of coal.

5. The process of claim 1 wherein the amount of ozone mixed with said stream is a stoichiometric amount.

6. The process for treating liquid streams containing iron carbonyl comprising the steps of
   (a) mixing with said stream up to a stoichiometric amount of ozone for reaction with said carbonyl to yield ferrous carbonate, and
   (b) removing the ferrous carbonate thus formed.

7. The process of claim 1 wherein the stream contains a major amount of methanol.

8. The process of claim 7 wherein the concentration of iron carbonyl is .01–10 parts per million.

9. The process of claim 6 wherein a stoichiometric amount of ozone is mixed with said carbonyl.

10. The process of claim 6 wherein the ferrous carbonate is removed by filtration.

11. The process of claim 6 wherein said ferrous carbonate is removed by centrifugation.

References Cited

UNITED STATES PATENTS

| | | | |
|---|---|---|---|
| 1,631,823 | 6/1927 | Jannek | 423—210 |
| 2,985,509 | 5/1961 | Breining et al. | 423—417 X |

FOREIGN PATENTS

| | | | |
|---|---|---|---|
| 1,106,598 | 3/1968 | Great Britain | 260—643 C |

EARL C. THOMAS, Primary Examiner

U.S. Cl. X.R.

423—417, 419; 210—50, 63; 260—643 C